Patented May 22, 1945

2,376,474

UNITED STATES PATENT OFFICE 2,376,474

NITROUREA PRODUCT

Lawton Arthur Burrows, Walter Cornelius Holmes, and Charles Philip Spaeth, Woodbury, N. J., assignors to E. I. du Pont de Nemours & Company, Wilmington, Del., a corporation of Delaware No Drawing. Application October 29, 1942, Serial No. 463,856

4 Claims. (Cl. 260—553)

This invention relates to an improved nitrourea product, and, more particularly, to a method of bringing about said improvement.

Nitrourea possesses considerable importance as an organic intermediate. As prepared by the methods of the prior art, the product shows a tendency to decompose at slightly elevated temperatures, particularly in the presence of water. A greater degree of stability would be desirable and would simplify and add safety during its storage, transportation, and use.

An object of the present invention is a nitrourea product possessing improved keeping properties. A further object is such a product having an enhanced degree of stability at elevated temperatures and in the presence of water. A still further object is a method of treating nitrourea whereby the foregoing improved product is obtained. Additional objects will be disclosed as the invention is described more at length hereinafter.

We have found that the foregoing objects are attained, and the disadvantages of the prior art overcome, when we mix nitrourea with a relatively small amount of a non-volatile acid, or with the acid salts of such acid, that is to say salts in which only a part of the replaceable hydrogen has been displaced by the base. We find sulfuric acid, sulfamic acid, and other acids in solid form to function satisfactorily in accordance with the invention and impart a markedly increased stability to nitrourea. Likewise, the acid salts of such acids have a favorable stabilizing effect, particularly ammonium acid sulfate.

The following examples will serve as specific illustrations of the beneficial results obtained by the inclusion with nitrourea of certain acids and acid salts:

Example 1

Preliminary tests with relatively unstable samples of nitrourea were carried out, two samples being tested, with and without the addition of sulfuric acid, for the amount of gas evolved on heating at 49° C. for two hours. The following results were obtained:

Sample 1:                                 Gas evolution, cc.
   No stabilizer_____ 10.2
   1% $H_2SO_4$_____ 5.8
Sample 2:
   No stabilizer_____ 5.2
   1% $H_2SO_4$_____ 0.0

The stabilizing effect of 1% $H_2SO_4$ is very apparent in the above.

Example 2

A sample of nitrourea was treated with a small amount of aqueous sulfuric acid so that the sulfuric acid content was 0.53% and water 4.24%. This sample was stored at a temperature of 90–100° F. for an extended period, a control sample of untreated nitrourea being maintained under exactly the same conditions. An initially wet sample was used because this was believed to constitute a severer test. At definite time intervals, the respective samples were tested for water content and for loss in weight in two hours at 70° C. These results are indicative of stability, since water content appears to increase and to promote instability, and a sample that shows a relatively low weight loss after two hours at 70° C. is considered satisfactory. The following results were obtained:

| | Time, days | | | | | | | |
|---|---|---|---|---|---|---|---|---|
| | 0 | 10 | 15 | 18 | 35 | 57 | 95 | 110 |
| Sample A: | | | | | | | | |
|   No stabilizer | | | | | | | | |
|   Per cent $H_2O$ | 3.31 | [1]D | | | | | | |
|   Per cent loss at 70° C. | 0.23 | | | | | | | |
| Sample B: | | | | | | | | |
|   0.53% $H_2SO_4$ | | | | | | | | |
|   Per cent $H_2O$ | 4.24 | | 3.26 | 2.54 | 0.54 | 0.30 | 0.14 | 0.66 |
|   Per cent loss at 70° C. | 0.04 | | 0.22 | 0.05 | 0.21 | 0.08 | 0.18 | [2]0.28 |

[1] Decomposed.
[2] Test discontinued.

The foregoing results show that the presence of a small amount of sulfuric acid adds greatly to the stability on storage of nitrourea at elevated summer temperatures, even in the presence of high moisture content.

While sulfuric acid possesses marked stabilizing properties toward nitrourea, as shown in the foregoing, it has the disadvantage of being a corrosive liquid. A solid material that would have the ability to accept ammonia would be more desirable in this respect. In the following example, tests were carried out using such materials.

Example 3

The following results were obtained in the manner described in Example 1.

|  | Stabilizer | Time, days | | | | | | | | | |
|---|---|---|---|---|---|---|---|---|---|---|---|
|  |  | 0 | 10 | 15 | 18 | 23 | 28 | 33 | 49 | 71 | 80 |
| Sample C | None |  |  |  |  |  |  |  |  |  |  |
| Per cent H₂O |  | 3.31 | D |  |  |  |  |  |  |  |  |
| Per cent loss at 70° C. |  | 0.23 |  |  |  |  |  |  |  |  |  |
| Sample D | Phosphoric acid |  |  |  |  |  |  |  |  |  |  |
| Per cent H₂O |  | 3.37 | 3.66 |  | D |  |  |  |  |  |  |
| Per cent loss at 70° C. |  | 0.12 | 0.15 |  |  |  |  |  |  |  |  |
| Sample E | Oxalic acid |  |  |  |  |  |  |  |  |  |  |
| Per cent H₂O |  | 2.78 | 1.88 |  |  | 3.31 |  | D |  |  |  |
| Per cent loss at 70° C. |  | 0.11 | 0.21 |  |  | 0.18 |  |  |  |  |  |
| Sample F | Tartaric acid |  |  |  |  |  |  |  |  |  |  |
| Per cent H₂O |  | 3.27 |  |  | 2.59 |  | D |  |  |  |  |
| Per cent loss at 70° C. |  | 0.15 |  |  | 0.43 |  |  |  |  |  |  |
| Sample G | Ammonium acid sulfate |  |  |  |  |  |  |  |  |  |  |
| Per cent H₂O |  | 3.44 |  | 3.19 | 2.16 |  |  |  | 0.15 | 0.37 | D |
| Per cent loss at 70° C. |  | 0.09 |  | 0.14 | 0.06 |  |  |  | 0.19 | 0.92 |  |
| Sample H | Sodium acid sulfate |  |  |  |  |  |  |  |  |  |  |
| Per cent H₂O |  | 3.75 |  | 2.20 |  |  |  | 4.25 | D |  |  |
| Per cent loss at 70° C. |  | 0.04 |  | 0.19 |  |  |  | 0.61 |  |  |  |

The presence of the above solid acids and acid salts is seen to have been beneficial.

*Example 4*

An additional series of tests was carried out by substantially the same procedure, in which sulfamic acid was blended with the nitrourea. The following results were obtained:

|  | Time, days | | | | | | | | |
|---|---|---|---|---|---|---|---|---|---|
|  | 0 | 6 | 14 | 21 | 28 | 31 | 43 | 57 | 98 |
| Sample J: No stabilizer |  |  |  |  |  |  |  |  |  |
| Per cent H₂O | 2.72 | D |  |  |  |  |  |  |  |
| Per cent loss at 70° C. | 0.21 |  |  |  |  |  |  |  |  |
| Sample K: 0.95% sulfamic acid |  |  |  |  |  |  |  |  |  |
| Per cent H₂O | 2.54 | 2.69 | 2.00 | D |  |  |  |  |  |
| Per cent loss at 70° C. | 0.17 | 0.00 | 0.41 |  |  |  |  |  |  |
| Sample L: No stabilizer |  |  |  |  |  |  |  |  |  |
| Per cent H₂O | 0.39 | 0.69 | 0.73 | 1.52 | 4.94 | D |  |  |  |
| Per cent loss at 70° C. | 0.13 | 0.16 | 2.31 | 7.99 | 54.85 |  |  |  |  |
| Sample M: 0.95% sulfamic acid |  |  |  |  |  |  |  |  |  |
| Per cent H₂O | 0.42 | 0.37 | 0.31 | 0.29 | 0.39 |  | 0.47 | 0.53 | ¹ 0.55 |
| Per cent loss at 70° C. | 0.09 | 0.01 | 0.06 | 0.19 | 0.10 |  | 0.21 | 0.19 | 0.17 |

¹ Test still in progress.

The samples containing sulfamic acid will be seen to be considerably more stable on storage than those containing no stabilizing material. Sample M, for example, showed no sign of deterioration at the end of 98 days of storage.

As shown in the foregoing, nitrourea tends to decompose on storage and to evolve gaseous products, one of which is ammonia. It has been demonstrated that, in the first phases of decomposition, the ammonia combines with undecomposed nitrourea to form the ammonium salt of nitrourea. The latter has been found to possess lower stability than nitrourea, particularly in the presence of water and at slightly elevated temperatures. The evolved ammonia, however, will preferentially react with acids and acid salts such as are disclosed herein, thereby preventing the formation of the unstable ammonium salt of nitrourea. It is believed that the stabilizers found to be most suitable owe their effectiveness to the fact that they form stable ammonium salts having hydrogen ion concentration values compatible with nitrourea. Water is, likewise, a decomposition product of nitrourea and appears to autocatalyze the decomposition. It will be noted that unusually high water contents in the storage tests are shown just prior to the appearance of serious decomposition whereas, as long as the stabilizer is effective, the moisture content remains substantially constant or decreases.

The stabilizer may be introduced into the product in any desired manner. Stabilizers of the solid type in finely divided form may be blended directly in the desired amount with the nitrourea. Likewise, any of the acids may be introduced in aqueous solution or dissolved in any solvent to the desired strength. If the nitrourea is mixed with inert solids, such solids may desirably be treated with the acid or acid salt prior to blending with nitrourea.

We have stated that our invention comprises the blending of non-volatile acids and their acid salts with nitrourea and thereby promoting the stability. By the term non-volatile acids we intend to designate acids having a boiling point above 100° C., for example sulfuric, propionic and acetic acids. Preferably, however, we employ solid acidic materials, for example such acids as sulfamic acids, oxalic acid, tartaric acid, benzene sulfonic acid, and phosphoric acids, and such acid salts as ammonium acid sulfate and sodium acid sulfate. Our preferred compounds for use are sulfamic acid, oxalic acid, ammonium acid sulfate, and sodium acid sulfate.

Relatively small amounts of the stabilizers are sufficient to give the desired effect. We find a range of amounts between 0.05% and 4.0% to be satisfactory. Actually, a safe procedure appears to be to employ such an amount of stabilizer that the equivalent of 1/100 mol of replaceable hydrogen will be present for each 100 grams of nitrourea.

We have described our invention at length in the foregoing. It will be understood, however, that many variations in details of procedure and compositions may be introduced, without departure from the spirit of the invention. We intend to be limited, therefore, only by the following patent claims.

We claim:

1. A stabilized product comprising nitrourea and a solid compound taken from the group consisting of acids and acid salts.

2. A product comprising nitrourea and sulfamic acid in an amount between 0.05% and 4.0% of the weight of the nitrourea.

3. A product comprising nitrourea and ammonium acid sulfate in an amount between 0.05% and 4.0% of the weight of the nitrourea.

4. A product comprising nitrourea and oxalic acid in an amount between 0.05% and 4.0% of the weight of the nitrourea.

LAWTON ARTHUR BURROWS.
WALTER CORNELIUS HOLMES.
CHARLES PHILIP SPAETH.